(12) United States Patent  
Moyer (10) Patent No.: US 7,334,059 B2  
(45) Date of Patent: Feb. 19, 2008

(54) MULTIPLE BURST PROTOCOL DEVICE CONTROLLER

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 514 days.

(21) Appl. No.: 10/792,591

(22) Filed: Mar. 3, 2004

(65) Prior Publication Data

US 2005/0198413 A1    Sep. 8, 2005

(51) Int. Cl.
  G06F 13/00  (2006.01)
  G06F 3/00  (2006.01)
  H03M 13/00  (2006.01)
(52) U.S. Cl. .......................... 710/35; 710/11; 710/16; 710/22; 714/762
(58) Field of Classification Search .............. None
  See application file for complete search history.

(56) References Cited

U.S. PATENT DOCUMENTS

| | | |
|---|---|---|
| 4,710,916 A | 12/1987 | Amstutz et al. |
| 5,548,587 A | 8/1996 | Bailey et al. |
| 5,774,683 A | 6/1998 | Gulick |
| 6,195,770 B1 | 2/2001 | Walton |
| 6,816,829 B1* | 11/2004 | Clark et al. .................. 703/21 |
| 2003/0012126 A1 | 1/2003 | Sudo |
| 2003/0056043 A1 | 3/2003 | Kostadinov |
| 2004/0199834 A1* | 10/2004 | Fukae ........................ 714/699 |

* cited by examiner

Primary Examiner—Alan Chen
(74) Attorney, Agent, or Firm—Michael P. Noonan; Joanna G. Chiu; Ranjeev Singh (57) ABSTRACT

Multiple burst memory access handling protocols may be implemented at the hardware level or evaluated and selected during design of the hardware. The appropriate burst protocol may be selectable based on burst characteristics such as burst types and the identity of the current bus master. This allows, for example, the ability for a slave to support multiple error protocols in a multi-master system on a chip (SoC), or to design slaves capable of interfacing with a variety of masters which use different burst handling protocols. Inputs such as a programmable control register or configuration pins or variables may be provided to as part of the slave or slave interface block (e.g., a memory controller) to facilitate the implementation of alternate burst protocols. When a burst request is received from a master, a burst characteristic corresponding to the requested burst is determined and one of a plurality of burst error protocols is selected based on the burst characteristic. The burst request is then processed according to the selected burst error protocol.

29 Claims, 3 Drawing Sheets

| NAME | DESCRIPTION | SETTINGS |
|---|---|---|
| BURST READ ERROR TERMINATION CONTROL FIELDS 60 AND 62 | MASTER X ERROR TERMINATION CONTROL- THESE BITS ARE USED TO CONTROL THE PROTOCOL USED ON BURST ACCESS READ ERRORS. | 00 – ERROR OCCURRING DURING A READ BURST TRANSFER DOES NOT AFFECT REMAINING BEATS OF THE READ BURST<br>01 – ERROR OCCURRING DURING A READ BURST TRANSFER CAUSES THE READ BURST TO BE ABORTED<br>10 – ERROR OCCURRING DURING THE FIRST BEAT ("CRITICAL WORD") CAUSES THE READ BURST TO BE TERMINATED; OTHER ERRORS DO NOT CAUSE READ BURST TERMINATION<br>11 – ERROR OCCURRING DURING AN UNDEFINED LENGTH READ BURST CAUSES THE READ BURST TO BE TERMINATED; ERRORS ON OTHER READ BURST TYPES DO NOT CAUSE READ BURST TERMINATION |
| BURST WRITE ERROR TERMINATION CONTROL FIELDS 64 AND 66 | MASTER X ERROR TERMINATION CONTROL- THESE BITS ARE USED TO CONTROL THE PROTOCOL USED ON BURST ACCESS WRITE ERRORS. | 00 – ERROR OCCURRING DURING A WRITE BURST TRANSFER DOES NOT AFFECT REMAINING BEATS OF THE WRITE BURST<br>01 – ERROR OCCURRING DURING A WRITE BURST TRANSFER CAUSES THE WRITE BURST TO BE ABORTED<br>10 – ERROR OCCURRING DURING THE FIRST BEAT ("CRITICAL WORD") CAUSES THE WRITE BURST TO BE TERMINATED; OTHER ERRORS DO NOT CAUSE WRITE BURST TERMINATION<br>11 – ERROR OCCURRING DURING AN UNDEFINED LENGTH WRITE BURST CAUSES THE WRITE BURST TO BE TERMINATED; ERRORS ON OTHER WRITE BURST TYPES DO NOT CAUSE WRITE BURST TERMINATION |

MULTIPLE BURST PROTOCOL DEVICE CONTROLLER

BACKGROUND

1. Field

The present invention relates to systems, and, more particularly, to bus and device access protocols within systems.

2. Description of the Related Art

In systems such as multi-master systems on chip (SoC), a slave device such as an SRAM or Flash memory controller must properly and efficiently support the interface protocol expectations of each potential master. In traditional platform-based designs, different masters may have different expectations on how burst transfers with errors are terminated. For example, direct memory access (DMA) masters and certain central processing units (CPU's) expect for a burst transfer to be aborted once an error is signaled on any beat of a burst transfer, whereas other CPU designs expect for the burst to continue in spite of the error signaling for a particular beat. This presents an issue for the memory controller. Traditional techniques use multiple protocols at higher levels than that of the MAC layer (hardware level). Such techniques do not resolve the issue of supporting bus transfers or multiple master protocols. Improved techniques of designing and implementing memory controllers are therefore desirable.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION

The following discussion is intended to provide a detailed description of at least one example of the invention to aid those skilled in the art to understand and practice the invention. Because the following discussion is exemplary, it should not be taken to be limiting of the invention itself. Rather, any number of variations may fall within the scope of the invention which is properly defined in the claims following this description.

It has been discovered that multiple protocols may be designed into the state machine design at the hardware level, and the proper protocol may be selected based on burst characteristics such as burst types, the identity of the current bus master, etc. This allows, for example, the ability for a slave to support multiple error protocols in a multi-master system on a chip (SoC), and to selectively terminate burst transfers in particular ways based on the particular master initiating the transfer. Protocol selection may be selected and controlled using a set of input configuration pins or a programmable register provided in the slave or slave interface block (e.g., a memory controller). In one embodiment, a multi-master system on a chip (SoC) memory controller is described which supports per-master burst error protocols. The master may be identified to the slave via various signals provided by the master or by logic external to a master. Each potential master will typically have a control field in a programmable register which indicates the proper protocol to be used. In one embodiment, the protocols can be independently programmed for read bursts and write bursts, since the handshake protocol can differ. In this way, a mechanism for efficiently selecting a bus protocol based on the current bus master by programmable control register means is provided for handling events such as burst error termination.

Figure 1:
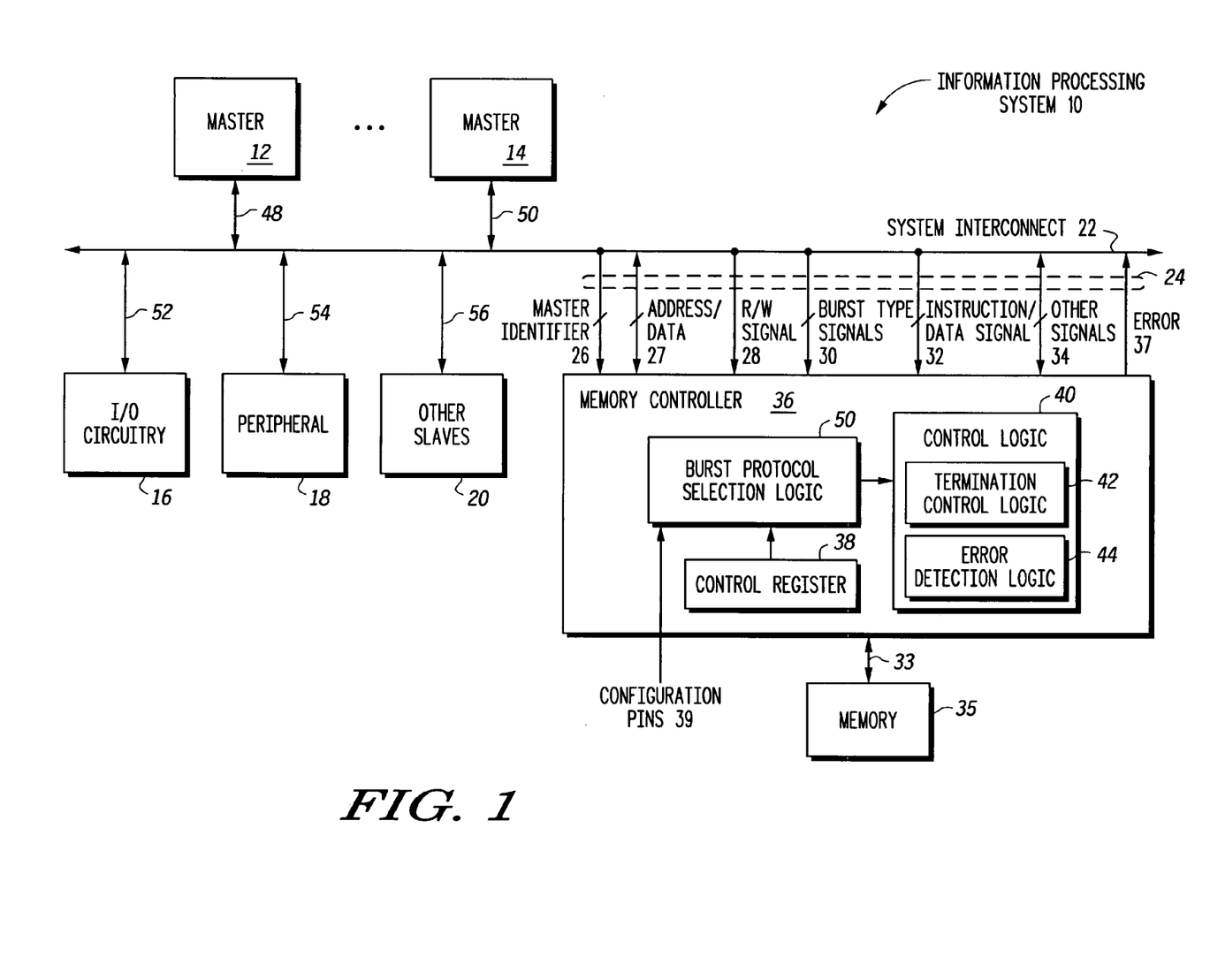
FIG. 1 illustrates, in block diagram form, an information processing system in accordance with one embodiment of the present invention.

FIG. 1 illustrates one embodiment of an information processing system 10. System 10 includes various system elements such as interconnect master 12, interconnect master 14, I/O circuitry 16, peripheral 18, and other slaves 20. Memory controller 36 and memory 35 are representative of another slave element within system 10. Memory 35 provides a shared storage unit since it is shared by more than one interconnect master. Memory controller 36 includes burst protocol selection logic 50, control register 38, and control logic 40. Control logic 40 includes termination control logic 42 and error detection logic 44.

System interconnect 22 interconnects master 12, master 14, I/O circuitry 16, peripheral 18, other slaves 20, and memory controller 36. Master 12 is bidirectionally coupled to system interconnect 22 via conductors 48, master 14 is bidirectionally coupled to system interconnect 22 via conductors 50, I/O circuitry is bidirectionally coupled to system interconnect 22 via conductors 52, peripheral 18 is bidirectionally coupled to system interconnect 22 via conductors 54, other slaves 20 is bidirectionally coupled to system interconnect 22 via conductors 56, and memory controller 36 is bidirectionally coupled to system interconnect 22 via conductors 24. Memory 35 is bidirectionally coupled to memory controller 36 via conductors 33.

Conductors 24 include various conductors for communicating memory and/or bus access information to memory controller 36. In the illustrated embodiment, such information includes a master identifier 26, address/data 27, a R/W signal 28, a burst type signal 30, an instruction/data signal 32, an error signal 37, and other signals 34. Some or all of such information may be transmitted to memory controller 36 for each instance of an access (e.g., a burst access) of memory 35 by master 12 or master 14 or other devices. Specific physical conductors need not be present for each type of memory access information. Such information may be transmitted serially or in another form.

In operation, masters 12 and 14 request access of system interconnect 22 to request access to other slaves 20, to peripherals 18, or to memory 35 via memory controller 36. A requesting master can provide an access request via system interconnect 22 to memory controller 36. The access request can be, for example, a read request or a write request for either data or instructions. The access may be a burst access in which a multi-beat read or write transfers a set of data blocks. Alternatively, a non-burst type of access may include a single beat read or write. Memory controller 36, in response to a read access request, provides the requested information (data or instructions) back to the requesting master via system interconnect 22.

A master identifier 26 is provided to memory controller 36 which identifies which master is requesting the current access. Memory controller 36 determines which master requested a burst access by processing master identifier 26. For example, master 12 may have an identifier of 0 and master 14 may have an identifier of 1. Therefore, each master can be assigned a unique identifier. In an alternate embodiment, some masters may share the same identifier. Thus, the identifier may identify a class of master as opposed to a uniquely identifiable master. Also, note that in alternate embodiments, the identity of the master requesting the access may be determined in ways other than by providing a signal such as master identifier 26.

An indication of whether the current access request is a read or a write type of access is communicated to memory controller 36 (and, for example, to control logic 40 discussed below) by R/W signal 28.

A burst type is provided to memory controller 36 via burst type signals 30. The burst type signals indicate whether the current access is a burst type of access or a non-burst type of access. If the access is a burst request, burst signals 30 also indicate the type of burst request. For example, burst type signals 30 can indicate whether a burst access is a bounded access or an unbounded access. Burst type signals 30 can also, or alternatively, indicate whether burst access is an incrementing burst type or a wrapping burst type. Burst transfers of data may be bounded and of a predetermined length, or may be unbounded, with a dynamically determined number of beats within the burst. Unbounded bursts may also be referred to as undefined-length bursts. Bounded bursts may also be referred to as fixed-length bursts. In one embodiment, bounded transfers of 4, 8, or 16 beats within a burst transfer are supported by information processing system 10. Other embodiments may support bounded bursts of other predetermined lengths.

Memory controller 36 also receives address information corresponding to the current access request and provides the requested information via address/data 27. Instruction/data signal 32 is provided to memory controller 36 to indicate whether the current access request is for an instruction or data. Any other signals needed to communicate to and from memory controller 36 may be provided within other signals 34.

Within memory controller 36, burst protocol selection logic 50 is coupled to receive burst control information from a burst control information source. In the illustrated embodiment, the burst control information is provided from at least one of control register 38 and configuration pins 39. Burst protocol selection logic 50 is coupled to provide burst protocol selection information to control logic 40 depending on the burst control information. Control logic handles the processing of burst requests to memory 35 using the burst protocol selection information. For example, in the illustrated embodiment, termination control logic 42 controls the termination of burst requests of memory 35 in accordance with the burst protocol selection information responsive to an error being detected by error detection logic 44.

Different types of burst protocols can be triggered by different types of burst characteristics, which may include, for example, which master is requesting the access, whether the access request is part a burst access or not, whether the burst request is bounded, unbounded, incrementing or wrapping. Therefore, based on the values of master identifier 26, R/W signal 38, and burst type signals 30 corresponding to a current access request (i.e. a current burst request) and based on control register 38 (and/or configuration pins 39), burst protocol selection logic 50 determines a burst operation that is triggered by the current access request and error conditions occurring pertinent thereto.

Figure 2:
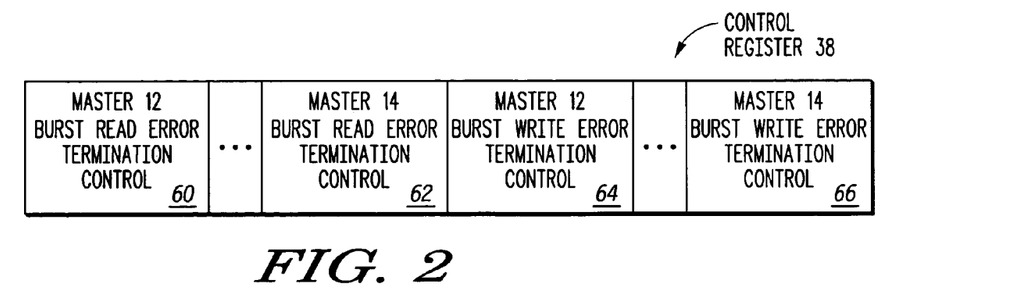
FIG. 2 illustrates, in block diagram form, a control register of the system of FIG. 1, in accordance with one embodiment of the present invention.

FIG. 2 illustrates one embodiment of control register 38 which includes fields for storing burst request control information such as a burst read error (BRE) termination control field and a burst write error (BWE) termination field for each master. As illustrated in FIG. 2, control register 38 includes master 12 BRE termination field 60, master 14 BRE termination field 62, master 12 BWE termination field 64, and master 14 BWE termination field 66. Therefore, in alternate embodiments, control register 38 may include more or less fields, as needed, to store the desired burst control information. Also note that control register 38 may be programmed via instructions from a master such as master 12 or 14 coupled to system interconnect 22. The values may be provided, for example, by a user or may be programmed at design time.

Figure 3:
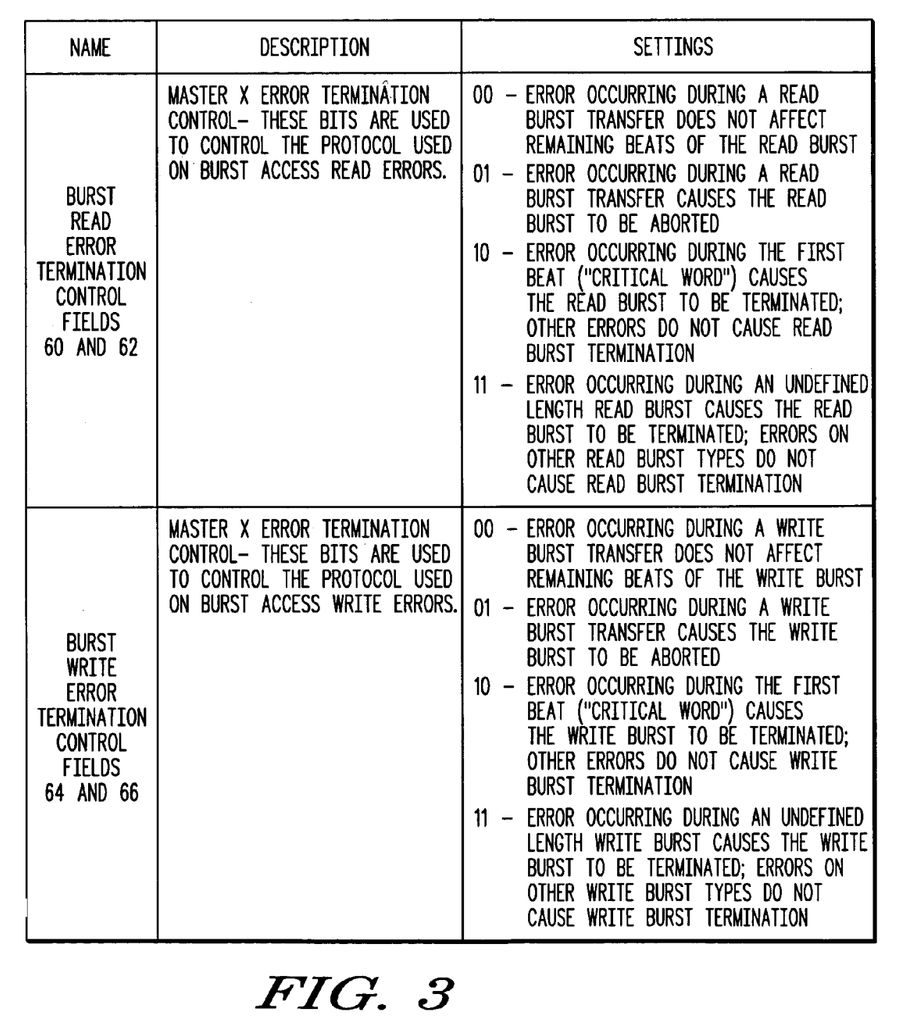
FIG. 3 illustrates, in table form, field descriptions of the control register of FIG. 2, in accordance with one embodiment of the present invention.

FIG. 3 illustrates one embodiment of the field definitions of control register 38 of FIG. 2. For example, in one embodiment, each of fields 60, 62, 64, and 66 are two-bit fields, where each field is capable of having 4 values (00, 01, 10, and 11). As described in FIG. 3, fields 60, 62, 64 and 66 include information to provide master-specific control of the protocols used for termination of burst requests upon the occurrence of burst read or write errors.

In the example of FIG. 3, each of BRE fields 60 and 62 are two-bit fields where a value of 00 indicates that no action is to be taken upon the occurrence of a burst read error. For example, if master 12 BRE field 60 is set to 00, then processing of a burst read request from master 12 continues unaffected by the error, and remaining beats of the read burst are allowed to complete. Similarly, if master 14 BRE field 62 is set to 00, then no error handling such as burst termination is triggered by a burst read error corresponding to a burst read from master 14.

A value of 01 for BRE fields 60 and 62 indicates that the read burst is to be aborted upon the occurrence of a burst read error during a data transfer. For example, if master 12 BRE field 60 is set to 01, then processing of a burst read request from master 12 is terminated by the error, and remaining beats of the read burst are not allowed to complete. Similarly, if master 14 BRE field 62 is set to 01, and an error occurs, burst termination error handling is triggered by a burst read error corresponding to a burst read from master 14.

A value of 10 for BRE fields 60 and 62 indicates that the read burst is to be aborted upon the occurrence of a burst read error during the first beat (critical word) of the transfer. For example, if master 12 BRE field 60 is set to 10, then processing of a burst read request from master 12 is terminated by the error if the error occurs during the first beat of the transfer to master 12, and remaining beats of the read burst are not allowed to complete. Other errors within the burst following the first beat do not cause read burst termination. If the same error occurs after the first beat of the transfer to master 12, any remaining beats of the read burst are allowed to complete. Also for example, if master 14 BRE field 62 is set to 10, and an error occurs on the first beat (critical word) during a burst read transfer involving master 14, burst termination error handling is triggered; if master 14 BRE field 62 is set to 10, and an error occurs after the critical word, burst termination error handling is not triggered.

A value of 11 for BRE fields 60 and 62 indicates that an error occurring during an undefined length read burst causes the read burst to be terminated whereas an error occurring during a defined length read burst does not cause termination. For example, if master 12 BRE field 60 is set to 11, then processing of a burst read request from master 12 is terminated by the error if the burst type (e.g., as indicated by burst type signals 30) is an undefined length burst request. In such a case, the remaining beats of the read burst are not allowed to complete. Similarly, if master 14 BRE field 62 is set to 11, and an error occurs, burst termination error handling is triggered if the burst type indicates an undefined length read burst from master 14.

Therefore, burst operations from memory 35 triggered by a burst access request from either of masters 12 or 14 can be determined and controlled based on BRE fields 60 and 62. Field 60 may hold a different value than field 62 when master 12 requires or desires a different burst handling protocol than master 14 requires or desires.

Each of BWE fields 64 and 66 are two-bit fields where a value of 00 indicates that no action is to be taken upon the occurrence of a burst write error. For example, if master 12 BWE field 64 is set to 00, then processing of a write burst request by master 12 continues unaffected by the error, and remaining beats of the write burst are allowed to complete. Similarly, if master 14 BWE field 66 is set to 00, then no error handling such as burst termination is triggered by a burst write error corresponding to a burst write from master 14.

A value of 01 for BWE fields 64 and 66 indicates that the write burst is to be aborted upon the occurrence of a burst write error during a data transfer. For example, if master 12 BWE field 64 is set to 01, then processing of a write burst request by master 12 is terminated by the error, and remaining beats of the write burst are not allowed to complete. Similarly, if master 14 BWE field 66 is set to 01, and an error occurs, burst termination error handling is triggered by a burst write error corresponding to a burst write from master 14.

A value of 10 for BWE fields 64 and 66 indicates that the write burst is to be aborted upon the occurrence of a burst write error during the first beat (critical word) of the transfer. For example, if master 12 BWE field 64 is set to 10, then processing of a write burst request by master 12 is terminated by the error if the error occurs during the first beat of the transfer to master 12, and remaining beats of the write burst are not allowed to complete. Other errors do not cause write burst termination. If the same error occurs after the first beat of the transfer to master 12, any remaining beats of the write burst are allowed to complete. Also for example, if master 14 BWE field 66 is set to 10, and an error occurs during a critical word transfer involving master 14, burst termination error handling is triggered; if master 14 BWE field 66 is set to 10, and an error occurs after the first beat (critical word), burst termination error handling is not triggered.

A value of 11 for BWE fields 64 and 66 indicates that an error occurring during an undefined length write burst causes the write burst to be terminated whereas an error occurring during a defined length write burst does not cause termination. For example, if master 12 BWE field 64 is set to 11, then processing of a burst write request from master 12 is terminated by the error if the burst type (e.g., as indicated by burst type signals 30) is an undefined length burst request. In such a case, the remaining beats of the write burst are not allowed to complete. Similarly, if master 14 BWE field 66 is set to 11, and an error occurs, burst termination error handling is triggered if the burst type indicates an undefined length write burst from master 14.

Therefore, write data burst operations to memory 35 triggered from either of masters 12 or 14 can be determined and controlled based on BWE fields 64 and 66, burst type signals 30 and master identifier signals 26. Field 64 may hold a different value than field 66 when master 12 requires or desires a different burst handling protocol than master 14 requires or desires. Field 60 may hold a different value than field 64 when master 12 requires or desires a different burst handling protocol for read bursts than for write bursts, and field 62 may hold a different value than field 66 when master 14 requires or desires a different burst handling protocol for read bursts than for write bursts.

Figure 4:
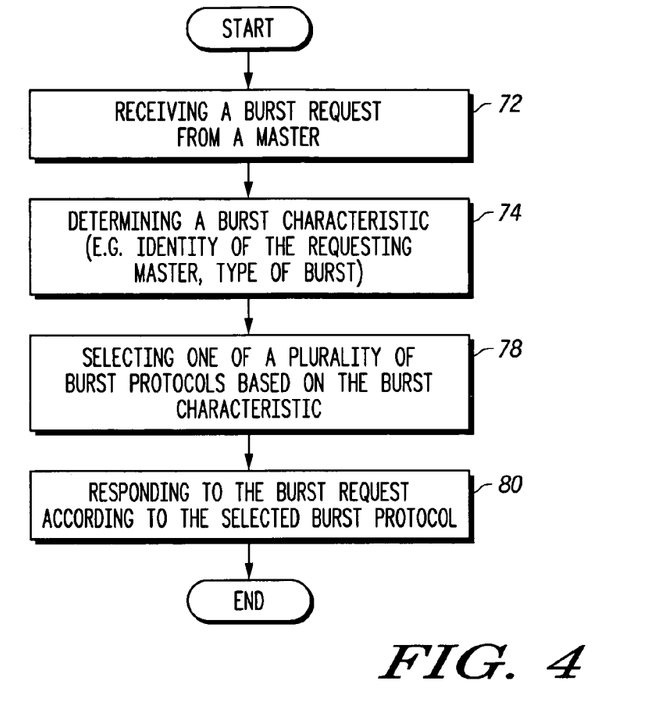
FIG. 4 illustrates, in flow diagram form, a method of processing a burst request with multiple burst protocols in accordance with one embodiment of the present invention.

FIG. 4 illustrates, in flow diagram form, operation of system 10 in accordance with one embodiment of the present invention. Flow begins at receive burst request operation 72 where a burst request from a master is received. This burst request can be many different types of request such as a read request, a write request, a request for data, a request for instructions, etc.

After the burst request is received, a burst characteristic of the received burst request is determined during determine burst characteristic operation 74. For example, the identity of the requesting master is determined. This is done through processing the master identifier 26 associated with the received burst request. For further example, the type of burst request is determined in addition or in alternative to determining the master identity. This is done through processing the burst type signals 30 associated with the received burst request.

After the burst characteristic is determined, one of several burst protocols is selected during select burst protocol operation 78. Exemplary burst protocols are illustrated in FIG. 3. These protocols depend on the determined burst characteristic. In the case of FIG. 3, the burst characteristic corresponds to the identity of the requesting master. Different masters may result in different settings of control register 38 and may even result in different results of such settings. Other factors which determine the final effect of the burst protocol include the nature of the burst (e.g., whether it is bounded). Different effects (in this case, termination processes) can be set for different types of burst access, as shown in FIG. 3. The settings for selection of the bus protocol information are provided via control register 38, configuration pins 39 or some other means. Note that in alternate embodiments, masters may share a common set of protocol control specifiers.

After the burst protocol is selected during select protocol operation 78, memory controller 36 responds to the burst request according to the selected burst protocol. Examples of such response are provided above with reference to FIG. 3.

In one embodiment, the selection of the burst protocol is performed during circuit design. For example, referring to FIG. 5, a hardware description language (HDL) representation of a controller may be processed to select and implement one or more of several burst protocols. At provide burst parameterizable HDL operation 82, HDL code representative of the controller is provided which can be programmed with different burst protocols. Once the burst parameterizable HDL is provided, a burst protocol is input to the HDL during provide burst parameter operation 84, and the burst parameterized HDL is evaluated at evaluate burst protocol parameter operation 86.

Figure 5:
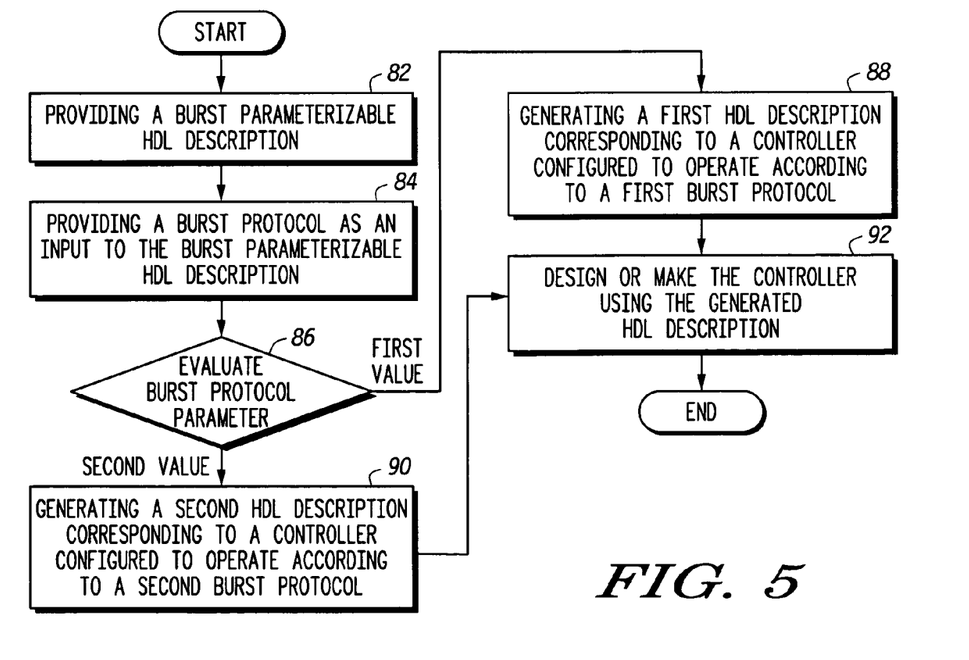
FIG. 5 illustrates, in flow diagram form, a method of processing hardware description language with multiple burst protocols in accordance with one embodiment of the present invention.

Depending upon the outcome of evaluation operation 86, a first value results and control transitions to generate first HDL operation 88, or a second value results and control transitions to generate second value HDL operation 90.

During generate first HDL operation 88, a first HDL description corresponding to a controller configured to operate according to a first burst protocol is generated. During generate second HDL operation 90, a second HDL description corresponding to a controller configured to operate according to a second burst protocol is generated. Other results may lead to other types of burst protocols being implemented in the generated HDL. An iterative process may be used to evaluate and implement (in HDL) various burst protocols until a final burst protocol is selected for a final HDL implementation.

Once a final HDL description is generated (e.g., during either of generate HDL operations 88 or 99), the controller is finally designed or made using the finally generated HDL description during operation 92.

Therefore, it can be appreciated how burst operations such as error handling can be triggered based on various types of burst characteristics such that systems can be made more flexible, performance can be increased and design of systems made more efficient. The embodiments described herein can be used to control burst requests in a variety of different ways and applications.

For example, in one embodiment, a method includes the steps of receiving a burst request from a master, determining a burst characteristic corresponding to the requested burst, selecting one of a plurality of burst error protocols based on the burst characteristic, and responding to the burst request according to the selected burst error protocol.

In a further embodiment, the step of determining the burst characteristic includes determining a burst type corresponding to the requested burst, and the selected burst error protocol is selected based on the determined burst type. The burst type may be a read burst type or a write burst type. The burst type may include a bounded burst type or an unbounded burst type. The burst type may include an incrementing burst type or a wrapping burst type.

In a further embodiment, the step of determining the burst characteristic includes determining an identity of the master corresponding to the requested burst, and the selected burst error protocol is selected based on the identity of the master.

In a further embodiment, the step of responding to the burst request according to the selected burst error protocol includes initiating a burst transfer, detecting an error during the burst transfer, and selectively terminating the burst transfer based on the selected burst error protocol.

In another embodiment, a memory controller includes burst protocol selection logic and control logic. The burst protocol selection logic determines at least one burst characteristic corresponding to a requested burst transfer and selects a burst error protocol based on the at least one burst characteristic. The control logic is coupled to the burst protocol selection logic. The control logic responds to a requested burst according to the selected burst error protocol.

In a further embodiment, the control logic initiates the requested burst transfer in response to the requested burst. In this embodiment, the memory controller further includes error detection logic and termination control logic. The error detection logic detects errors during the requested burst transfer. The termination control logic selectively terminates the requested burst transfers based on the selected burst error protocol provided by the burst protocol selection logic.

In a further embodiment, the memory controller also includes a control register coupled to the burst protocol selection logic. The burst protocol selection logic selects the burst error protocol based on the at least one burst characteristic and information stored in the control register. In yet a further embodiment, the information stored in the control register indicates a plurality of burst error protocols, and the burst protocol selection logic selects the burst error protocol from the plurality of burst error protocols. In yet a further embodiment, each of the plurality of burst error protocols corresponds to a burst type. The burst type includes at least one of a read burst type, write burst type, bounded burst type, and unbounded burst type. In yet a further embodiment, the at least one burst characteristic comprises a burst type of the requested burst transfer.

In another further embodiment, the memory controller is configurable to communicate with a plurality of masters. Each of the plurality of burst error protocols corresponds to a master of the plurality of masters. In yet a further embodiment, the at least one burst characteristic comprises an identifier of a master requesting the requested burst transfer.

In another further embodiment, the burst protocol selection logic selects the burst error protocol based on the at least one burst characteristic and information provided via configuration inputs. In a further embodiment, the information provided via the configuration inputs indicates a burst error protocol to the burst protocol selection logic.

In another further embodiment, the memory controller is implemented in hardware. In another further embodiment, the memory controller is implemented in software that is encoded on a computer readable medium.

In another embodiment, a memory controller includes: means for receiving a burst request from a master; means for determining a burst characteristic corresponding to the requested burst; means for selecting one of a plurality of burst error protocols based on the burst characteristic; and, means for responding to the burst request according to the selected burst error protocol.

In a further embodiment, the means for determining the burst characteristic includes means for determining a burst type corresponding to the requested burst. The selected burst error protocol is selected based on the burst type. In yet a further embodiment, the burst type comprises at least one of a read burst type, a write burst type, a bounded burst type, an unbounded burst type, an incrementing burst type, and a wrapping burst type.

In another further embodiment, the means for determining the burst characteristic includes means for determining an identity of the master corresponding to the requested burst, and wherein the selected burst error protocol is selected based on the identity of the master.

In another further embodiment, the means for responding to the burst request according to the selected burst error protocol includes: means for initiating a burst transfer; means for detecting an error during the burst transfer; and, means for selectively terminating the burst transfer based on the selected burst error protocol.

In another embodiment, a burst request is received from a master (e.g., in an information processing system including a master). A burst type of the requested burst is determined. The burst type includes one of a read burst type and a write burst type. One of a plurality of burst protocols is selected based on the burst type. The burst request is responded to according to the selected burst protocol. In a further embodiment, an identity of the master corresponding to the requested burst is determined. The selected burst protocol is selected based on the burst type and the identity of the master corresponding to the requested burst.

In another embodiment, a memory controller includes burst protocol selection logic and control logic coupled to the burst protocol selection logic. The burst protocol selection logic determines a burst type corresponding to a requested burst transfer and selects a burst protocol based on the burst type. The burst type includes one of a read burst type and a write burst type. The control logic responds to a requested burst according to the selected burst protocol. The memory controller may be implemented in hardware or software.

In a further embodiment, the memory controller also includes a control register coupled to the burst protocol selection logic. The burst protocol selection logic selects the burst protocol based on the burst type and information stored in the control register. In yet a further embodiment, the information stored in the control register indicates a plurality of burst protocols. The burst protocol selection logic selects the burst protocol from the plurality of burst protocols.

In another embodiment, a method includes the following steps: receiving a burst request from a master; determining an identity of the master corresponding to the requested burst; selecting one of a plurality of burst error protocols based on the identity of the master corresponding to the requested burst; and, responding to the burst request according to the selected burst error protocol.

In another embodiment, a memory controller is configurable to communicate with a plurality of masters. The memory controller includes burst protocol selection logic and control logic coupled to the burst protocol selection logic. The burst protocol selection logic determines an identity of one of the plurality of masters corresponding to a requested burst transfer and selects a burst error protocol based on the identity of the one of the plurality of masters. The control logic responds to a requested burst according to the selected burst error protocol. The memory controller may be implemented in hardware or software.

In a further embodiment, the memory controller also includes a control register coupled to the burst protocol selection logic. The burst protocol selection logic selects the burst protocol based on the identity of the one of the plurality of masters and information stored in the control registers. In yet a further embodiment, the information stored in the control register indicates a plurality of burst protocols. Each protocol corresponds to a master of the plurality of masters. The burst protocol selection logic selects the burst protocol from the plurality of burst protocols.

In another embodiment, a method includes the steps of providing a burst parameterizable hardware description language (HDL) description; providing a burst protocol parameter as an input to the burst parameterizable HDL description; generating a first HDL description corresponding to a memory controller configured to operate according to a first burst protocol when the burst protocol parameter has a first value; and generating a second HDL description corresponding to a memory controller configured to operate according to a second burst protocol when the burst protocol parameter has a second value.

In a further embodiment, the first burst protocol and the second burst protocol are different burst protocols. In yet a further embodiment, each of the first burst protocol and the second burst protocol indicates whether a burst transfer is terminated in response to detecting an error during the burst transfer.

In another further embodiment, the method includes the step of designing a memory controller using the generated one of the first and second HDL description. In another further embodiment, the method includes the step of making a memory controller using the generated one of the first and second HDL description.

In another embodiment, a burst parameterizable HDL description encoded on a computer readable medium includes: a first set of instructions for receiving a burst protocol parameter, a second set of instructions for generating a first memory controller model when the burst protocol parameter has a first value, and a third set of instructions for generating a second memory controller model when the burst protocol parameter has a second value. The first memory controller model corresponds to a memory controller which operates according to a first burst protocol, and the second memory controller model corresponds to a memory controller which operates according to a second burst protocol.

In a further embodiment, the first burst protocol and the second burst protocol are different burst protocols. In yet a further embodiment, each of the first burst protocol and the second burst protocol indicates whether a burst transfer is terminated in response to detecting an error during the burst transfer.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of may different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 35 may be located on a same integrated circuit as masters 12 and 14 or on a separate integrated circuit or located within another peripheral or slave discretely separate from other elements of system 10. Peripheral 18 and I/O circuitry 16 may also be located on separate integrated circuits or devices. Also for example, system 10 or portions thereof may be soft or code representations of physical circuitry or of logical representations convertible into physical circuitry. As such, system 10 may be embodied in a hardware description language of any appropriate type.

Moreover, the various elements of system 10 are representative of their more general classes. For example, bus master 12 and bus master 14 may be processors capable of executing instructions, such as microprocessors, processor cores, digital signal processors, or may be any other type of interconnect master, such as direct memory access (DMA) circuitry or debug circuitry. Peripheral 18 may be any type of peripheral, such as a universal asynchronous receiver transmitter (UART), a real time clock (RTC), a keyboard controller. Note that other slaves 20 may include any type of interconnect slaves, such as, for example, a memory accessible by masters 12 and 14, as well as any type of peripheral which resides on the system bus, including the same types of peripherals as peripheral 18. I/O circuitry 16 may include any type of I/O circuitry which receives or provides information external to system 10. Memory 35 may be any type of computer readable media such as, for example, a read only memory (ROM), a random access memory (RAM), non-volatile memory (e.g. Flash), magnetic RAM (MRAM), etc. Because the use of any specific exemplar herein is typically intended to be representative of its class unless specifically stated otherwise, the noninclusion of any specific devices in any exemplary lists herein should not be taken as indicating that limitation is desired.

System interconnect 22 may be implemented as a system bus operating according to a system bus protocol, or implemented using interconnect circuitry, such as, for example, switching circuitry, which routes information between the various devices. As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Alternative embodiments may combine multiple instances of a particular component. For example, in the above described embodiment, a single peripheral 18 is illustrated in FIG. 1. In other embodiments, system 10 may include any number of peripherals coupled to system interconnect 22. Likewise, any number of masters and slaves may be coupled to system interconnect 22 and are not limited to those shown in FIG. 1. Memory 35 can include any number of memory devices of various types.

In alternate embodiments, control register 38 may include more or less fields for each master with more or less bits, as needed. Also, the settings described in FIG. 3 for the fields of control register 38 are provided as an example. Alternate embodiments may determine error responses based on different attributes than those provided in FIG. 3, more attributes that those of FIG. 3, or a subset of those in FIG. 3. Also note that in alternate embodiments, the particular attributes for a current access request can be indicated to control circuitry 40 in a variety of ways other than by signals 26, 28 and 30 illustrated in FIG. 1.

Furthermore, those skilled in the art will recognize that boundaries between the functionality of the above described operations merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method comprising:
   receiving a burst request from a master;
   determining a burst characteristic corresponding to the requested burst;
   selecting one of a plurality of burst error protocols based on the burst characteristics, wherein determining the burst characteristic comprises determining a burst type corresponding to the requested burst, and the selected burst error protocol is selected based on the burst type; and
   responding to the burst request according to the selected burst error protocol.

2. The method of claim 1, wherein the burst type comprises one of a read burst type and a write burst type.

3. The method of claim 1, wherein the burst type comprises one of a bounded burst type and an unbounded burst type.

4. The method of claim 1, wherein the burst type comprises one of an incrementing burst type and a wrapping burst type.

5. The method of claim 1, wherein determining the burst characteristic comprises determining an identity of the master corresponding to the requested burst, and the selected burst error protocol is selected based on the identity of the master.

6. The method of claim 1, wherein responding to the burst request according to the selected burst error protocol comprises:
   initiating a burst transfer;
   detecting an error during the burst transfer; and
   selectively terminating the burst transfer based on the selected burst error protocol.

7. A memory controller executed at least in part by one or more processors, comprising:
   burst protocol selection logic which determines at least one burst characteristic corresponding to a requested burst transfer and selects a burst error protocol based on the at least one burst characteristic, wherein the at least one burst characteristic comprises a burst type of the requested burst transfer;
   control logic, coupled to the burst protocol selection logic, which responds to a requested burst according to the selected burst error protocol, wherein the control logic initiates the requested burst transfer in response to the requested burst and further comprises:
      error detection logic which detects an error during the requested burst transfer; and
      termination control logic which selectively terminates the requested burst transfer based on the selected burst error protocol provided by the burst protocol selection logic; and
   a control register, coupled to the burst protocol selection logic, wherein the burst protocol selection logic selects the burst error protocol based on the at least one burst characteristic and information stored in the control register, wherein the information stored in the control register indicates a plurality of burst error protocols, and wherein the burst protocol selection logic selects the burst error protocol from the plurality of burst error protocols, wherein each of the plurality of burst error protocols corresponds to a burst type, the burst type comprising at least one of a read burst type, write burst type, bounded burst type, and unbounded burst type.

8. The memory controller of claim 7, wherein the memory controller is configurable to communicate with a plurality of masters, and wherein each of the plurality of burst error protocols corresponds to a master of the plurality of masters.

9. The memory controller of claim 8, wherein the at least one burst characteristic comprises an identifier of a master requesting the requested burst transfer.

10. The memory controller of claim 7, wherein the burst protocol selection logic selects the burst error protocol based on the at least one burst characteristic and information provided via configuration inputs.

11. The memory controller of claim 10, wherein the information provided via the configuration inputs indicates a burst error protocol to the burst protocol selection logic.

12. The memory controller of claim 7, wherein the memory controller is implemented in hardware.

13. The memory controller of claim 7, wherein the memory controller is implemented in software that is encoded on a computer readable medium.

14. A memory controller executed at least in part by one or more processors, comprising:
    means for receiving a burst request from a master;
    means for determining a burst characteristic corresponding to the requested burst;
    means for selecting one of a plurality of burst error protocols based on the burst characteristic; and
    means for responding to the burst request according to the selected burst error protocol, wherein the means for responding to the burst request according to the selected burst error protocol comprises:
        means for initiating a burst transfer;
        means for detecting an error during the burst transfer; and
        means for selectively terminating the burst transfer based on the selected burst error protocol.

15. The memory controller of claim 14, wherein the means for determining the burst characteristic comprises means for determining a burst type corresponding to the requested burst, and wherein the selected burst error protocol is selected based on the burst type.

16. The memory controller of claim 15, wherein the burst type comprises at least one of a read burst type, a write burst type, a bounded burst type, an unbounded burst type, an incrementing burst type, and a wrapping burst type.

17. The memory controller of claim 14, wherein the means for determining the burst characteristic comprises means for determining an identity of the master corresponding to the requested burst, and wherein the selected burst error protocol is selected based on the identity of the master.

18. A memory controller executed at least in part by one or more processors, configurable to communicate with a plurality of masters, comprising:
    burst protocol selection logic which determines an identity of one of the plurality of masters corresponding to a requested burst transfer and selects a burst error protocol based on the identity of the one of the plurality of masters;
    a control register, coupled to the burst protocol selection logic, wherein the burst protocol selection logic selects the burst protocol based on the identity of the one of the plurality of masters and information stored in the control register; and
    control logic, coupled to the burst protocol selection logic, which responds to a requested burst according to the selected burst error protocol.

19. The memory controller of claim 18, wherein the information stored in the control register indicates a plurality of burst protocols, each corresponding to a master of the plurality of masters, and wherein the burst protocol selection logic selects the burst protocol from the plurality of burst protocols.

20. The memory controller of claim 18, wherein the memory controller is implemented in hardware.

21. The memory controller of claim 18, wherein the memory controller is implemented in software that is encoded on a computer readable medium.

22. A memory controller executed at least in part by one or more processors, comprising:
    burst protocol selection logic which determines at least one burst characteristic corresponding to a requested burst transfer and selects a burst error protocol from a plurality of burst error protocols based on the at least one burst characteristic, wherein the memory controller is configurable to communicate with a plurality of masters, and wherein each of the plurality of burst error protocols corresponds to a master of the plurality of masters; and
    control logic, coupled to the burst protocol selection logic, which responds to a requested burst according to the selected burst error protocol.

23. The memory controller of claim 22, wherein the control logic initiates the requested burst transfer in response to the requested burst and further comprises:
    error detection logic which detects an error during the requested burst transfer; and
    termination control logic which selectively terminates the requested burst transfer based on the selected burst error protocol provided by the burst protocol selection logic.

24. The memory controller of claim 22, further comprising:
    a control register, coupled to the burst protocol selection logic, wherein the burst protocol selection logic selects the burst error protocol based on the at least one burst characteristic and information stored in the control register.

25. The memory controller of claim 24, wherein the information stored in the control register indicates a plurality of burst error protocols, and wherein the burst protocol selection logic selects the burst error protocol from the plurality of burst error protocols.

26. The memory controller of claim 25, wherein each of the plurality of burst error protocols corresponds to a burst type, the burst type comprising at least one of a read burst type, write burst type, bounded burst type, and unbounded burst type.

27. The memory controller of claim 22, wherein the at least one burst characteristic comprises a burst type of the requested burst transfer.

28. The memory controller of claim 22, wherein the at least one burst characteristic comprises an identifier of a master requesting the requested burst transfer.

29. The memory controller of claim 22, wherein the burst protocol selection logic selects the burst error protocol based on the at least one burst characteristic and information provided via configuration inputs.

* * * * *

UNITED STATES PATENT AND TRADEMARK OFFICE
CERTIFICATE OF CORRECTION

| | |
|---|---|
| PATENT NO. | : 7,334,059 B2 |
| APPLICATION NO. | : 10/792591 |
| DATED | : February 19, 2008 |
| INVENTOR(S) | : William C. Moyer |

It is certified that error appears in the above-identified patent and that said Letters Patent is hereby corrected as shown below:

In Column 13, Line 61, Claim No. 1:
 Change "on the burst characteristics, wherein determining" to --on the burst characteristic, wherein determining--

Signed and Sealed this

Twelfth Day of August, 2008

JON W. DUDAS
*Director of the United States Patent and Trademark Office*